Patented Sept. 10, 1935

2,013,989

UNITED STATES PATENT OFFICE 2,013,989

PROCESS OF PREPARING ACETYL CHLORIDE

Georg Meder, Munster-on-the-Taunus, Walter Geissler, Frankfort-on-the-Main-Hochst, and Erich Eggert, Frankfort-on-the-Main-Sindlingen, Germany, assignors to I. G. Farbenindustrie Aktiengesellschaft, Frankfort-on-the-Main, Germany No Drawing. Application April 24, 1933, Serial No. 667,613. In Germany April 30, 1932

4 Claims. (Cl. 260—123)

The present invention relates to a process of preparing acetyl chloride.

The hitherto known processes of preparing acetyl chloride by the reaction of phosgene on gaseous acetic acid use porous substances, such as charcoal, as catalysts. The catalytic effect of the said substances is very small; moreover, charcoal has a short lifetime, thus making the process uneconomical.

We have now found that acetyl chloride can be prepared in a simple and economical manner, while avoiding the disadvantages inherent to the hitherto used catalysts, by reacting gaseous acetic acid and phosgene in the presence of highly active carbons which for brevity's sake will hereinafter be called "phosphoric acid activated carbons" and which are obtained according to the processes described in the U. S. Patents Nos. 1,525,770 and 1,621,195, by subjecting carbonaceous material, if desired in admixture with a fossil carbon formed after the cretaceous period to a carbonizing operation in the presence of an acid of phosphorus. The said highly active carbons can be used either in a pure state or in admixture with silicic acid, or difficultly volatile metal chlorides or metal oxides, such as cuprous chloride, copper oxide, barium chloride and the like.

The phosphoric acid activated carbons are distinguished by a catalytic effect on the present reaction which is about 10 times as good as that of ordinary charcoal and show a much longer life than charcoal, thus rendering them particularly suitable for the purpose in question.

The new process can be carried out at any temperature above the boiling point of acetic acid and, if desired, under raised or diminished pressure. In practice ordinary pressure is used and a temperature of about 200° C. to 250° C. Acetic acid and phosgene are used in approximately stoichiometric proportions, a small excess of acetic acid being preferable. Instead of previously prepared phosgene there may be used a mixture of equal volumes of chlorine gas and carbon monoxide.

The following claims are directed to the use of "phosphoric acid activated carbons"; it is to be understood, however, that the present invention is not limited to the use of said catalysts, but is intended to comprise every other highly active carbon which, as to stability and internal surface, is considered to be equivalent to phosphoric acid activated carbons. Active carbons, in order to be suitable for the purpose in question, must have as high an internal surface as possible which can be determined by the heat evolved on moistening with water and, besides it, a sufficient lifetime, that is stability which can be determined by measuring the hardness. We have made numerous tests and have found that only such highly active carbons are suitable for the purpose in question and permit of preparing acetyl chloride in an economical manner as are capable of producing an effect of the same order of magnitude as that of phosphoric acid activated carbons, the effect being due to the internal surface and the lifetime, as pointed out above. The following table shows the differences between some of the best known types of active carbons. With respect to the table it is pointed out that the charge of acetic acid and phosgene was the same in each case and that the amount of active carbon is 1 liter by volume in each case, the size of grains being 2 to 3 mm. The left hand column shows the active carbon used whereas the right hand column shows the amount of acetyl chloride formed during the period in which the acetic acid and the phosgene introduced are completely transformed into acetyl chloride. The table thus illustrates the efficacy of the active carbons, the efficacy depending on the internal surface and the lifetime:

| | Kilograms |
|---|---|
| Ordinary charcoal | 20 |
| Steam activated carbon from fly ash | 1 |
| Active carbon obtained according to the process described in U. S. Patent No. 1,582,718 | 20 |
| Zinc chloride activated carbon obtained according to the process described in German Patent No. 290,656 | 100 |
| Phosphoric acid activated carbon obtained according to the processes described in U. S. Patents Nos. 1,525,770 and 1,621,195 | 200 |

The above table teaches that only the zinc chloride activated carbon shows an efficacy of the same order of magnitude as phosphoric acid activated carbon, whereas the three first enumerated carbons are outside the scope of the present invention.

The following examples serve to illustrate the invention, but they are not intended to limit it thereto:

(1) 600 grams of vapor of glacial acetic acid and 990 grams of phosgene are conducted in the course of 1 hour through a layer of phosphoric acid activated carbon of 1¼ liter by volume as it is obtained according to the processes described in U. S. Patents Nos. 1,621,195 and 1,525,770. To this active carbon there may be added subsequently or during its manufacture either silicic acid or difficultly volatile metal chlorides and metal oxides, such as cuprous chloride, copper oxide, barium chloride or the like. The reaction is preferably conducted in such a manner that the temperature in the reaction chamber does not considerably exceed 250° C. The reaction gases which are drawn off are cooled to a low temperature, for instance, −32° C. and there are obtained 784 grams of liquid acetyl chloride. In the presence of an excess of glacial acetic acid of about 5 per cent. the product obtained is practically free from phosgene.

(2) Instead of the phosgene which is used in Example 1, there can be introduced its components, carbon monoxide and chlorine, into the reaction chamber, because these gases, as is known, are capable of forming phosgene at a raised temperature and in the presence of highly active carbon. The process is otherwise carried out as described in Example 1.

We claim:

1. The process which comprises causing phosgene to react with gaseous acetic acid in the presence of a phosphoric acid activated carbon.

2. The process which comprises causing phosgene to react at a temperature not exceeding 250° C. with gaseous acetic acid in the presence of a phosphoric acid activated carbon.

3. The process which comprises causing a mixture of phosgene and gaseous acetic acid to react in approximately stoichiometric proportions in the presence of a phosphoric acid activated carbon.

4. The process which comprises causing a mixture of phosgene and gaseous acetic acid to react in approximately stoichiometric proportions in the presence of a phosphoric acid activated carbon and subjecting the gases of reaction to a low cooling process.

GEORG MEDER.
WALTER GEISSLER.
ERICH EGGERT.